(Model.)
W. R. MOORE.
TOP PROP.
No. 372,556. Patented Nov. 1, 1887.
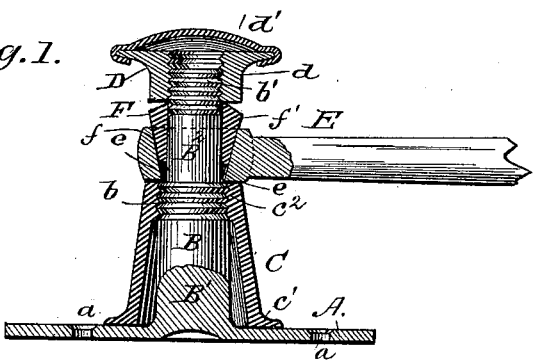
Fig. 1.
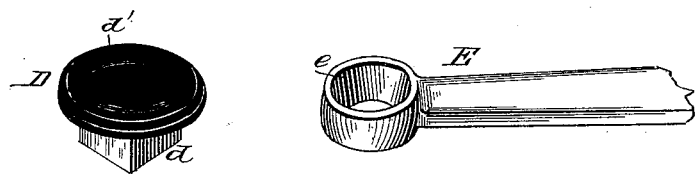
Fig. 2.
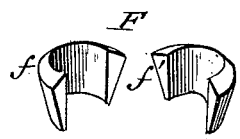
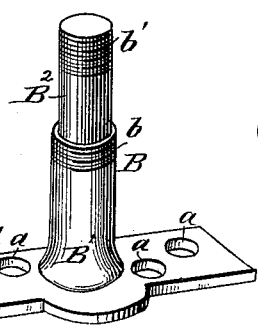
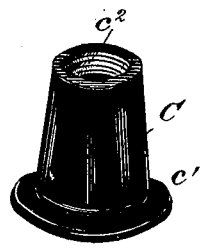
WITNESSES:
Fred G. Dieterich
Wm. H. Rowe
INVENTOR:
Wm. R. Moore
BY Munn & Co.
ATTORNEYS.

UNITED STATES PATENT OFFICE.

WILLIAM R. MOORE, OF UNIONVILLE, PENNSYLVANIA.

TOP-PROP.

SPECIFICATION forming part of Letters Patent No. 372,556, dated November 1, 1887.

Application filed June 22, 1887. Serial No. 242,186. (Model.)

*To all whom it may concern:*

Be it known that I, WILLIAM R. MOORE, of Unionville, in the county of Chester and State of Pennsylvania, have invented a new and useful Improvement in Top-Prop Joints, of which the following is a specification.

My invention relates to improved means for securing the bow-iron to the seat-iron or top-prop stud, to provide an anti-prop rattler for carriages and top-buggies; and the improvement consists in certain constructions and combinations of parts, hereinafter described, and particularly designated in the claims.

In the accompanying drawings, Figure 1 is a vertical cross-section of my improved top-prop joint, and Fig. 2 is a perspective view of the parts detached.

The seat-iron A is preferably cast of malleable iron integral with a top-prop stud, B, and has holes $a\ a$ cast therein, to receive screws for securing said seat-iron and stud to the seat of the carriage. The stud B has an enlarged base, B', screw-threaded at its end $b$, to receive a sleeve or thimble, C, and a reduced portion or stem, $B^2$, screw-threaded at $b'$, to receive a nut, button, or head, D, having a square shoulder, $d$, to which a wrench may be applied, and a cap, $d'$, suitably ornamented, to conceal the end of the screw-stem and hold the arm or bow-iron E in place upon the stud B.

The thimble C has a flange, $c'$, at its larger end or base, and a screw-thread, $c^2$, upon the inside of its smaller end, to inclose and give a neat appearance to the base B' of the stud, and also to form a shoulder, against which the bow-iron E may solidly bear.

The arm or bow-iron E is countersunk and reamed out to provide a smooth conical hole, $e$, into which a divided conical bush, F, formed of separate pieces, $f f'$, may be fitted to closely embrace the non-screw-threaded portion $b^2$ of the stud-stem $B^2$, and to provide a tight or anti-friction joint between the bow-iron and the top-prop stud. As the bushing F is made of separate parts, it will bind firmly upon the stud when the nut is turned, as the parts will be forced toward each other and will have no tendency to spring apart (as might a prior split conical-spring bushing) and bind on the arm or bow E, but will allow the arm or bow to turn freely upon it. The outer ends of the bushing-sections are inclined or beveled, so as to come against the nut near its aperture or axis, where the leverage would be so small as not to turn the nut, even if the bushing should accidentally turn at any time by reason of a neglect to adjust the nut properly.

The divided conical bushing may be applied to any ordinary top-prop joint by reaming out the brace-bar.

I claim as my invention and desire to secure by Letters Patent—

1. The combination, with a stud and an arm having a conical aperture, through which the stud passes, of a conical bushing formed of separate parts entering the said conical aperture, and a nut screwed on the stud and bearing against the said bushing, whereby the bushing may bind on the stud and allow the arm to turn freely on it without rotating it and loosening the nut, substantially as set forth.

2. The combination, with a stud and an arm having a conical aperture, through which the stud passes, of a conical bushing fitting in said aperture and made in separate parts beveled outwardly on their outer ends, and a nut screwed on the said stud and bearing against said bushing at the inner edges of the inclined ends of the sections, substantially as set forth.

WILLIAM R. MOORE.

Witnesses:
    EUGENE RAWDON,
    JESSE TAYLOR.